C. M. BRENNAN.
TROLLEY WHEEL.
APPLICATION FILED JUNE 2, 1915.
1,154,170.
Patented Sept. 21, 1915.
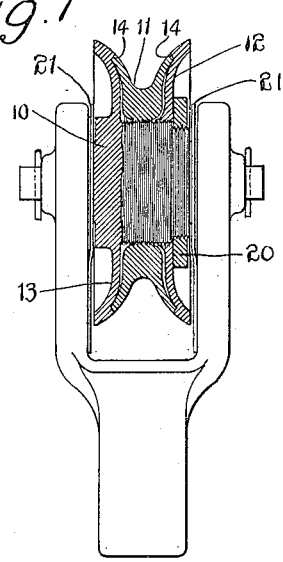
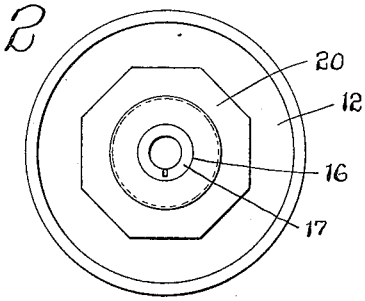
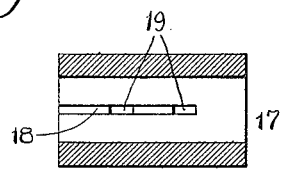
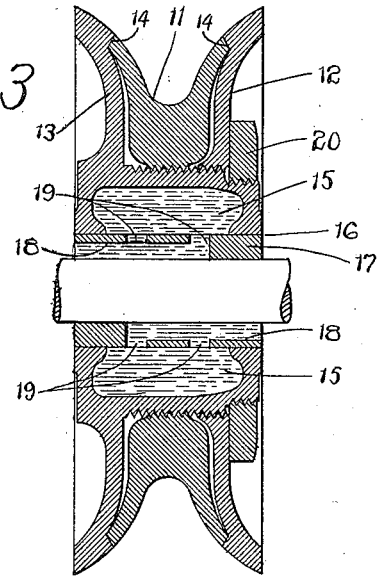
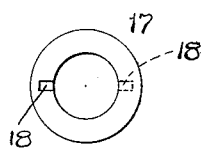
WITNESSES:
INVENTOR
Charles M. Brennan
BY
ATTORNEY

UNITED STATES PATENT OFFICE.

CHARLES M. BRENNAN, OF BRIDGEPORT, CONNECTICUT.

TROLLEY-WHEEL.

1,154,170.  Specification of Letters Patent.  Patented Sept. 21, 1915.

Application filed June 2, 1915. Serial No. 31,767.

*To all whom it may concern:*

Be it known that I, CHARLES M. BRENNAN, a citizen of the United States, residing at Bridgeport, county of Fairfield, State of Connecticut, have invented an Improvement in Trolley-Wheels. of which the following is a specification.

This invention has for its object to provide a self-lubricating trolley wheel in which the cost of construction will be reduced to the minimum by reduction in the number of parts and the use only of parts that can be easily cast and machine work dispensed with, and which shall be so constructed that the parts are interchangeable and the tread may be easily removed and replaced when wanted. With these and other objects in view I have devised the novel trolley wheel which I will now describe, referring to the accompanying drawing forming a part of this specification and using reference characters to indicate the several parts:

Figure 1 is a view showing my novel wheel in position in a harp, the wheel being partly in section and partly in elevation; Fig. 2 a view of the wheel detached, as seen from the right in Fig. 1; Fig. 3 a section on an enlarged scale of the wheel complete; Fig. 4 a section of the sleeve detached on a line at right angles to the section line in Fig. 3, and Fig. 5 is an end elevation of the sleeve, as seen from the left in Fig. 4.

10 denotes the body of my novel wheel which is provided with an external left-hand screw thread with which the tread 11 has threaded engagement and which is engaged by a thread upon a removable flange 12.

13 denotes a fixed flange which is cast integral with the body.

Both of the flanges are provided on their inner faces with recesses 14 which receive the corresponding faces of the tread. The tread is ordinarily made of copper or bronze but the body and flanges may be iron castings. The central portion of the body is cored out to form a central lubricant reservoir 15.

16 denotes a central opening through the wheel with which the lubricant reservoir communicates, and 17 a bearing sleeve which engages the wall of the opening with a drive fit. The inner wall of the sleeve is provided with slots 18 which extend in opposite directions from the outer end of the sleeve inward past the midlength thereof and communicate with the lubricant reservoir by one or more openings 19.

In assembling, the reservoir is packed with suitable semi-fluid lubricating material and then the sleeve is driven to place. The tread and the removable flange both have threaded engagement with the left-hand thread on the body and are of course easily removable. The end of the body on the side which receives the removable flange is reduced in diameter and is provided with a right-hand thread which is engaged by a nut 20. This nut when turned up tightly bears against the removable flange and retains said flange and the tread securely in place. On account of the reverse threads of the nut and the flange, any loosening of the flange would tend to make a tighter lock between the flange and the nut, which in fact serves as a lock nut.

The inner faces of the harp are shown as provided with springs 21 which bear against the opposite ends of the body and prevent looseness and rattling. The lubricant in the reservoir fills the grooves and lubricates the stud or axle upon which the wheel turns and the lubricant also passes out at the ends of the groove and lubricates the sides of the wheel, that is, the contact surfaces between the springs and the ends of the body. The wear in use is largely of course upon the tread. When a tread becomes worn, the nut and the removable flange are removed, then the tread is turned off from the body, a new tread turned to position thereon and then the removable flange and nut are replaced. A worn wheel is thus made as good as new and is ready for use again with but a moment's delay and no expense other than the new tread. Should the bearing sleeve become worn, or the lubricant reservoir require refilling, the sleeve may be removed, the reservoir repacked with lubricant and the old or a new sleeve driven to place.

Having thus described my invention I claim:—

1. A trolley wheel comprising a body having a lubricant reservoir formed therein and one flange formed integral therewith, a removable flange, a tread between the flanges and a bearing sleeve having internal slots which communicate with the lubricant reservoir.

2. A trolley wheel comprising a body having a lubricant reservoir formed therein and one flange formed integral therewith, a removable flange, a tread between the flanges and a bearing sleeve having internal slots extending in opposite directions from the ends past the center and openings from the slots communicating with the reservoir.

3. A trolley wheel comprising a body having a lubricant reservoir formed therein, a screw thread thereon and a flange formed integral therewith, a tread threaded to engage the body, a removable flange also threaded to engage the body, and means for retaining said flange and the tread in place.

4. A trolley wheel comprising a body having a lubricant reservoir formed therein, a left-hand thread formed thereon and a flange formed integral therewith, a tread and a removable flange having threaded engagement with the body, and a right-hand nut by which the tread and removable flange are locked in place.

5. A trolley wheel comprising a body having an integral flange, a lubricant reservoir, an external left-hand thread and a reduced right-hand thread outside the left-hand thread, a tread and a removable flange engaging the left-hand thread, and a nut engaging the right-hand thread by which the tread and removable flange are locked in place.

In testimony whereof I affix my signature.

CHARLES M. BRENNAN.

Copies of this patent may be obtained for five cents each, by addressing the "Commissioner of Patents, Washington, D. C."